(12) United States Patent
Chen

(10) Patent No.: US 8,310,139 B2
(45) Date of Patent: Nov. 13, 2012

(54) LED LAMPS USING RECYCLED METAL CONTAINERS AS HEAT SINKS

(76) Inventor: Yujia Chen, Fuzhou (CN)

(*) Notice: Subject to any disclaimer, the term of this patent is extended or adjusted under 35 U.S.C. 154(b) by 0 days.

(21) Appl. No.: 12/897,768

(22) Filed: Oct. 4, 2010

(65) Prior Publication Data
US 2012/0080993 A1    Apr. 5, 2012

(51) Int. Cl.
*H01J 61/52* (2006.01)
(52) U.S. Cl. ................................ 313/46; 313/11; 313/45
(58) Field of Classification Search ................ 313/11, 313/45, 46, 47, 498, 512
See application file for complete search history.

(56) References Cited

U.S. PATENT DOCUMENTS

2010/0219735 A1* 9/2010 Sakai et al. ..................... 313/46
* cited by examiner

*Primary Examiner* — Vip Patel
(74) *Attorney, Agent, or Firm* — Enterprise Partners LLC; Yonghao Hou

(57) ABSTRACT

The core of this invention is that using recycled metal cans (after pretreatment processes) as a good heat sink, the lamp cups, of the LED lamps to adhere to the lamp bases, circuit boards with LED and lamp cups through advanced technology, there by producing a variety of LED lamps. And finally, this invention achieves a complete metal construction of LED lamps which not only improves the thermal performance of LED lamps but also develops a low-carbon, environmentally friendly and economical way of metal containers recycling consequently makes this LED lamps suitable to be widely used for the purpose of illumination or decoration.

7 Claims, 1 Drawing Sheet

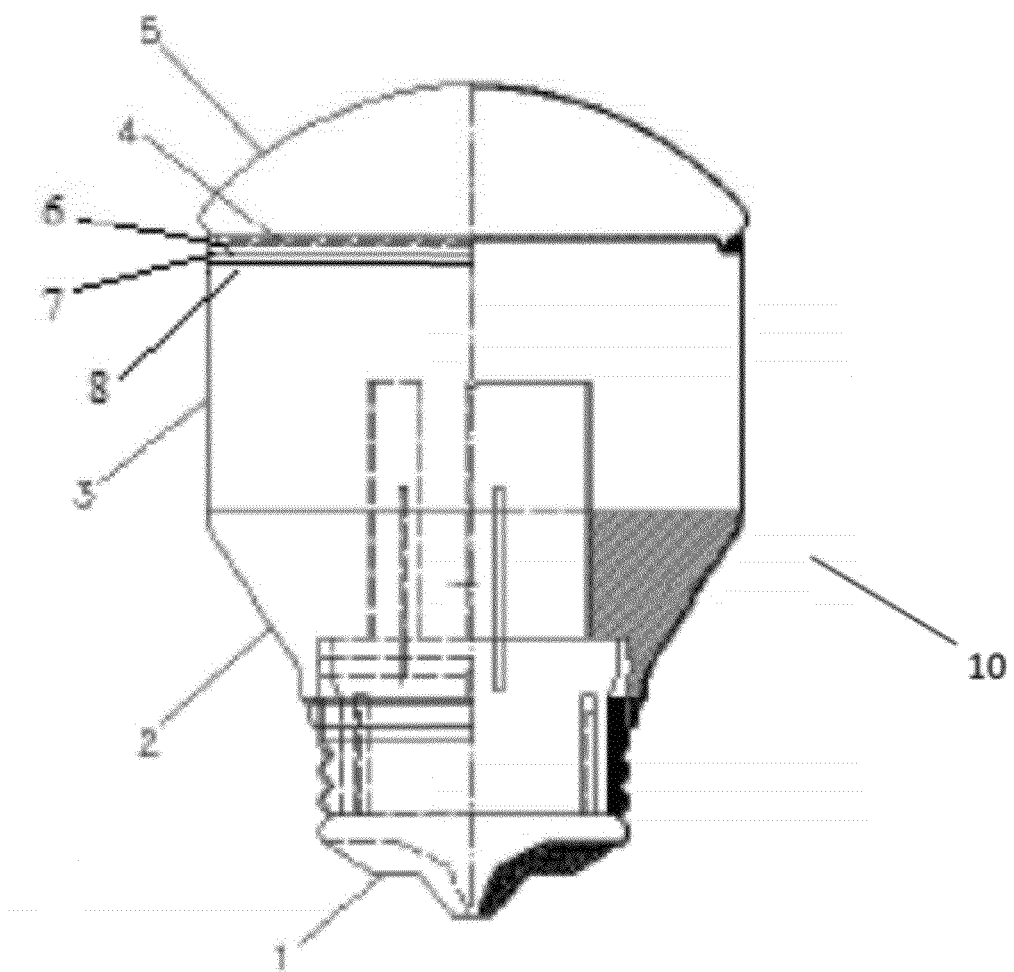

LED LAMPS USING RECYCLED METAL CONTAINERS AS HEAT SINKS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not applicable.

BACKGROUND OF THE INVENTION

This invention relates to the field of LED lamps, especially a kind of LED lamps which use recycled metal containers as their heat sinks.

Most of the recycled metal beverage cans, such as Coca-Cola, Pepsi Cola, Tsingdao beer and Budweiser beer's cans which are made of aluminum, or Red bull, Wa ha ha and Wong Lo Kat's cans which are made of tinplate, will only be able to be used after melting, refinement, and a serious of metal processing. Therefore, a considerable amount of energy is consumed unavoidably during the recycling process of the metal cans, which obviously diverges from the prevailing theme of "Low-Carbon Economy" all over the contemporary world.

Additionally, the thermal conductivity of metal materials is higher than 60 watts per kelvin per meter. Thus, the recycled metal containers are a kind of ideal material for heat sinks. With the development of the LED lamps, more and more heat generates during their work because of the continual requests for the smaller volume and higher power. For LED lamps, the heat generates during their workings will affect their luminance and lives. When an LED lamp is overheating, its luminance will become lower, its color will turn lighter and the life will be shortened. So, the thermal performance of LED lamps will be improved significantly if recycled cans could be used as their heat sinks.

BRIEF SUMMARY OF THE INVENTION

This invention discloses a kind of LED lamps using recycled metal containers (e.g., beverage cans, cigarette cans, tea cans, milk powder cans, pesticide spray cans, etc.) as heat sinks, which consists of 4 main parts, viz. lamp base, lamp cup, circuit board with LED and lamp cover (lamp bases are fixed to one end of the lamp cups through plastic electrically insulating shells, the lamp covers are fixed to the other end of the lamp cups and the circuit boards are fixed to the outer bottom of lamp cups and contained in the space surrounded by the outer bottom of the lamp cups and the lamp covers). The recycled metal containers (after the pretreatment processes such as cleaning, sterilization, etc.) are directly used as the lamp cups, and the outer bottoms of which are used as the metal surfaces for the adhering of circuit boards. The circuit boards have a layer of copper foil which adheres to the metal surface through the adhesive. By using the recycled metal containers as the lamp cups, the LED lamps will have a complete metal construction and a considerably improved thermal function. Furthermore, the metal containers will be recycled in a low-carbon, environmentally friendly and economical way, thereby meeting the request of the theme of "Low-carbon Economy".

DETAILED DESCRIPTION OF THE INVENTION

The purpose of this invention is to overcome the insufficiency of the present technology and to provide a kind of LED lamps using the recycled metal containers as heat sinks which simultaneously meets the "Low-Carbon Economy" requests and improves the thermal performance of LED lamps.

The technical program taken by this invention to solve the technical problem is: a kind of LED lamps using recycled metal containers (e.g., beverage cans, cigarette cans, tea cans, milk powder cans, pesticide spray cans, etc.) as heat sinks, which consists of 4 main parts that are lamp base, lamp cup, circuit board with LED and lamp cover (lamp bases are fixed to one end of the lamp cups through plastic electrically insulating shells, the lamp covers are fixed to the other end of the lamp cups and the circuit boards are fixed to the outer bottom of lamp cups and contained in the space surrounded by the outer bottom of the lamp cups and the lamp covers). The recycled metal containers (after the pretreatment processes such as cleaning, sterilization, etc.) are directly used as the lamp cups, and the outer bottoms of which are used as the metal surfaces for the adhering of circuit boards. The circuit boards have a layer of copper foil which adheres to the metal surface through the adhesive.

The recycled metal containers mentioned above are made of a variety of common metal materials.

The adhesive mentioned above (type one) is the thermally conductive and electrically insulating adhesive. The copper foil layer of the circuit board adheres to the outer bottom of the lamp cup through this thermally conductive and electrically insulating adhesive.

The adhesive mentioned above (type two) is tin solder. The outer bottoms of the lamp cups mentioned above are plated with metal plating. The copper foil layer of the circuit boards is soldered to this metal plating of the lamp cups through the tin solder.

The metal plating mentioned above is made through electroplating, chemical plating, vapor deposition or sputtering deposition.

This invention of the LED lamps using recycled metal containers as heat sinks can use either tin solder or thermally conductive and electrically insulating adhesive as the adhesive applied between lamp cups and circuit boards. But the thermally conductive and electrically insulating adhesive works better than tin solder as the adhesive applied between lamp cups and circuit boards.

The benefits of this inventions are not only that a complete metal construction and a greatly improved thermal performance of the LED lamps which controls the working temperature of the LED lamps efficiently, but also developing a recycling process of the metal containers which meets the requests of "low-carbon, eco-friendly and economical".

The following is a preferred embodiment combined with the drawing as a further instruction of this invention. But this invention (LED lamps using recycled metal containers as heat sinks) is not limited to this preferred embodiment.

BRIEF DESCRIPTION OF THE DRAWING

FIG. 1 is a schematic diagram of this invention.

DESCRIPTION OF THE PREFERRED EMBODIMENT

The preferred embodiment, please refer to FIG. 1, is a kind of this invention: LED lamps using recycled metal containers as heat sinks which consists of lamp base 1, plastic electrically insulating shell 2, lamp cup 3, circuit board with LED 4, lamp cover 5.

FIG. 1 shows the claimed invention of LED lamp 10. The lamp base 1 is fixed to one end of the lamp cup 3 through a plastic electrically insulating shell 2. The lamp cover 5 is fixed to the other end of the lamp cup 3. The LED lamp's circuit. board 4 is fixed to the outer bottom of the lamp cup 3 and it is contained in the space surrounded by the outer bottom of the lamp cup 3 and the lamp cover 5. The recycled metal container, i.e., lamp cup 3, (after the pretreatment processes such as cleaning, sterilization, etc.) is directly used as the lamp cup 3. The outer bottom of lamp cup 3 is used as a metal surface for its adhering to circuit board 4. The circuit board 4 further has a layer of copper foil 6 which adheres to the metal surface through a selective adhesive 7.

As an optimum, the recycled metal container mentioned above is aluminum beverage can.

The adhesive 7 mentioned above can be either a thermally conductive and electrically insulating adhesive material, or a tin solder. When using the thermally conductive and electrically insulating material, the copper foil layer 6 of the circuit board 4 is adhered to the outer bottom of the lamp cup 3 through this adhesive 7. When using the tin solder as the adhesive 7, the outer bottom of the lamp cup 3 needs to be plated with a metal plating 8 to improve its solderability since it is made of aluminum. After that, the copper foil layer 6 of the circuit board 4 can be soldered to the metal plating 8.

The metal plating on the outer bottom of the lamp cup 3 mentioned above is made through electroplating, chemical plating, vapor deposition or sputtering deposition.

As an optimum, the thermally conductive and electrically insulating adhesive is used as the adhesive through which the circuit board 4 is fixed to the lamp cup 3. Because the resin, the matrix of thermally conductive and electrically insulating adhesive, is a kind of glue, so an appropriate curing temperature can be chosen during adhering, for example, epoxy resin adhesive can be cured at room temperature or the temperature up to 302° F. (150° C.), which is much lower than the tin soldering temperature of above 392° F. (200° C.) and therefore avoid the material deformation, thermal fatigue of electronic components and internal stress caused by the high soldering temperature. Moreover, the minimum pitch of tin soldering of 0.0256 inch (0.65 mm) makes the tin soldering already not be able to meet the demand for the electrically conductive connection of the circuit boards because of the trend of miniaturization and higher density of them while the thermally conductive and electrically insulating adhesive can be made into a variety of thermally and electrically conductive adhesives by adding different kinds of metal powders, thus achieving a high line resolution. Additionally, the process of thermally conductive and electrically insulating adhesive is simple and easy to operate, which can increase productivity and prevent the heavy metal pollution caused by lead in tin solder.

The metal beverage cans has a high thermal conductivity and the excellent thin metal wall.

Additionally, the cans are cleaned by an advanced cleaning technology which guarantees the cleanliness of the surface and reduces the thermal resistance, thus enhancing the thermal conductivity. For these reasons, this invention uses recycled metal containers, especially recycled aluminum beverage cans as LED lamp cups and adhesive, especially thermally conductive and electrically insulating adhesive, to adhere or solder the copper foil layer of the circuit boards to the lamp cups, which achieve not only a compete metal construction, a better thermal performance and a efficiently controlled working temperature of LED lamps, but also a way of metal containers recycling which meets the request of "low-carbon, environmentally friendly and economical".

The preferred embodiment mentioned above is only for a further instruction of a type of this invention: LED lamps using recycled metal beverage cans as heat sinks, but this invention is not limited to the preferred embodiment. Any simple modification, equivalent change or decoration to the preferred embodiment based on the essential technologies of this invention is inside the scope of protection of the technical program of this invention.

The invention claimed is:

1. An energy preserving LED lamp having at least the following parts:
   a. a lamp base;
   b. at least one lamp cup made of recycled metal retainer;
   c. a polycarbonate lamp cover; and
   d. an LED circuit board with a layer of copper foil,
   wherein said lamp base is fixed to one end of the lamp cup through a plastic electrically insulating shell, and the lamp cup adheres to the copper foil layer of the circuit board through an adhesive.

2. The LED lamp according to claim 1, wherein the recycled metal container is a heat sink.

3. The LED lamp according to claim 1, wherein the adhesive is thermally conductive and electrically insulating.

4. The LED lamp according to claim 1, wherein the adhesive is a tin solder.

5. The LED lamp according to claim 4, wherein the outer bottom of the recycled container further contains a metal plating soldered to the copper foil layer of the circuit board through the tin solder.

6. The LED lamp according to claim 1, wherein the light color of the lamp is white or other different colors.

7. The LED lamp according to claim 1, wherein the LED lamp is used for illumination and decoration.

\* \* \* \* \*